(No Model.)

C. FINCH & J. HUMMEL.
AUTOMATIC VALVE FOR GAS SERVICE PIPES.

No. 422,583.        Patented Mar. 4, 1890.

WITNESSES:
S. B. Brewer,
Thos. H. Gibbons

INVENTORS:
CALEB FINCH, AND
JOHN HUMMEL, by William W. Low

ATTORNEY.

UNITED STATES PATENT OFFICE.

CALEB FINCH AND JOHN HUMMEL, OF ALBANY, NEW YORK.

AUTOMATIC VALVE FOR GAS-SERVICE PIPES.

SPECIFICATION forming part of Letters Patent No. 422,583, dated March 4, 1890.

Application filed June 12, 1889. Serial No. 314,048. (No model.)

*To all whom it may concern:*

Be it known that we, CALEB FINCH and JOHN HUMMEL, both of the city and county of Albany, in the State of New York, have invented a new and useful Automatic Valve for Gas-Service Pipes, of which the following is a specification.

Our invention relates to a valve for gas-service pipes which will close automatically when exposed to heat of unusual degree; and the object of our invention is to provide means for automatically shutting off the flow of gas in a burning building. This object we attain by the mechanism illustrated in the accompanying drawings, which is herein referred to and form part of this specification, and in which—

Figure 1:
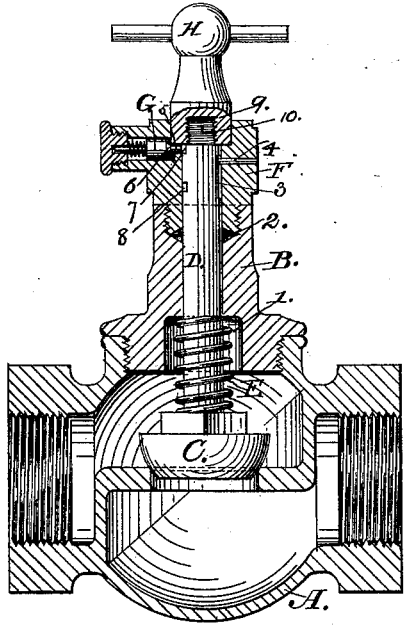
Figure 2:
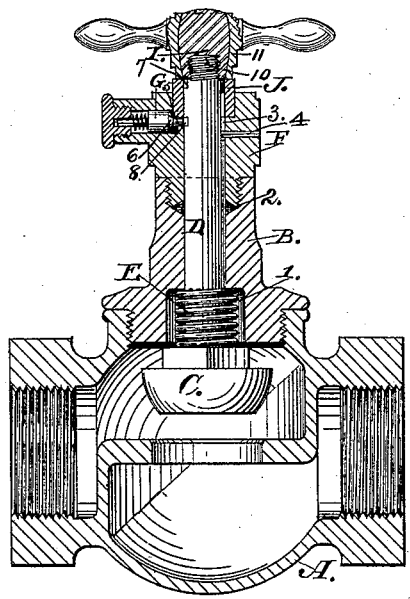
Figure 3:
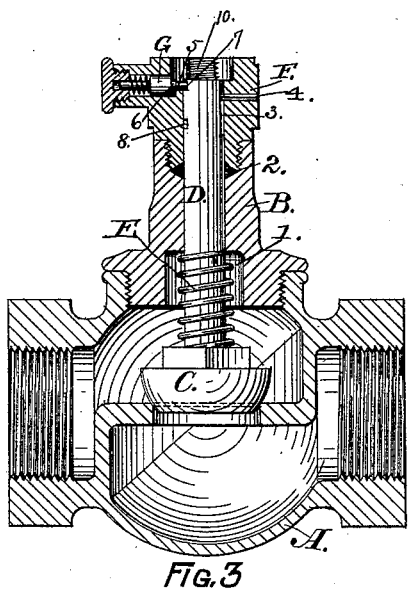
Figure 4:
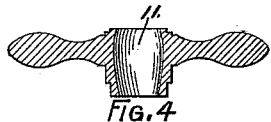
Figure 5:
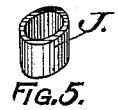

Figure 1 is a longitudinal section of the valve-casing, showing the valve closed with the opening-handle applied thereto. Fig. 2 is a like section showing the valve opened and retained by the fusible nut, which is attached to the head of the valve-stem. Fig. 3 is a like section showing the valve closed. Fig. 4 is a longitudinal section of the shell for the fusible nut, and Fig. 5 is a perspective view of a sleeve used in conjunction with the fusible nut for disengaging the locking device.

As represented in the drawings, A designates the valve-casing, which has the form of one used for an ordinary globe-valve. B is the bonnet for said casing, which has a recess 1 in its lower end for receiving the spring by which the valve is closed, and a stuffing-box 2 in its upper end for containing packing for forming a tight joint about the valve-stem.

C is the valve, which is of the ordinary form, and is either attached to or made integral with the valve-stem D. Said valve is forced to its seat by a spring E, which is contained in the recess of the bonnet B, and whose upper end bears against the top of said recess, with the lower end bearing against the upper face of the valve C. The valve-stem D passes through the bore of the bonnet B and the cap F of the stuffing-box. Said stem is provided with a groove 3, in which engages a stud 4, fixed in the cap F, for the purpose of hold the stem from rotating. The cap F is provided with a spring-actuated bolt G, having a small stem 5 on its inner end, which extends from a coniform shoulder 6 of said bolt. The stem of the latter is fitted to engage in holes in the valve-stem D for the purpose of retaining the valve in its open and closed positions—that is to say, said stem enters the upper hole 7 for holding the valve down to its seat and it enters the lower hole 8 to hold said valve up from its seat.

H is the handle used for raising the valve C from its seat, and it is provided with a screw-threaded socket 9, which is fitted to engage on a screw 10, formed on the upper end of the valve-stem D. The outer diameter of said socket is fitted to engage with the coniform shoulder of the bolt G, so that when the handle H is screwed onto the valve-stem D the socket 9 will force the bolt G backward to release the stem 5 from the hole 7, so as to leave the valve C and its stem D free to be raised when a strain is applied to the handle H.

I is the fusible nut, which is fitted to screw upon the screw 10 of the valve-stem when the valve C is raised from its seat and held up by the stem of the bolts G entering the hole 8 in the valve-stem. Said nut is made of fusible alloy that will melt at a low temperature, and it is cast in a shell 11 of hard metal, the latter being provided with suitable arms, by which the nut can be turned in either direction when required.

J is a sleeve, which may be a separate piece to be used conjunctively with the nut I, or it may form a prolongation of the lower end of said nut; but preferably it is made separately, and the purpose of said sleeve is to force the bolt G backward to release the stem 5 from the lower hole 8 in the valve-stem, so that the valve C will be under the control of the spring E to effect the closing movement of said valve at the moment the nut I is melted to release the valve-stem.

Heretofore great loss has been occasioned at fires by reason of the breaking of the gas-pipes in a building where the stop-cock in the service-pipes was inaccessible, whereby a flow of the gas into the burning building increased the flame, and the purpose of our invention is to remedy this difficulty.

Our automatic valve operates in the following manner: To open the valve, the handle H is screwed onto the upper end of the valve-stem D, so as to force the bolt G backward to retract the stem 5 from the hole 7 in the valve-stem. The valve is then raised by the handle H until the stem 5 engages in the hole 8 to lock the valve in an open position, and the handle H is then removed from the valve-stem D. The sleeve J is then fixed on the upper end of said valve-stem and the nut I is screwed on said valve-stem to force said sleeve down, so that the latter will push back the bolt G to release the stem 5 from the hole 8, thereby leaving the parts of the valve in the position shown in Fig. 2. On the occurrence of a fire, whereby sufficient heat is created to melt the fusible nut I and release the valve-stem D from the control of said nut, the spring E will force the valve C down to its seat and prevent a further flow of gas through the pipes.

While we have stated this valve is especially designed for use in service-pipes, it is manifestly adapted to use in the supply-pipes for each story of a building, or at any other points where it may be desirable to place it.

We claim as our invention—

In an automatic stop-valve, the combination of a valve-casing, a spring-actuated valve for closing the passage through said casing, said valve having a stem provided with openings to receive the bolt of a temporary locking device, a detachable handle for lifting said valve from its seat, a spring-bolt for temporarily retaining said valve in a raised position, a nut of fusible alloy fitted on said stem to hold said valve in its raised position, and a loose sleeve fitted on said stem and operated by said nut to disengage the hold of said spring-bolt on said valve-stem, all being constructed and combined to operate substantially as herein specified.

CALEB FINCH.
JOHN HUMMEL.

Witnesses:
 WM. H. LOW,
 S. B. BREWER.